United States Patent [19]
Griffin

[11] Patent Number: 5,196,832
[45] Date of Patent: Mar. 23, 1993

[54] ELECTRIC POWER SYSTEM WITH LINE FAILURE DETECTION

[75] Inventor: John M. Griffin, Wapakoneta, Ohio

[73] Assignee: Sundstrand Corporation, Rockford, Ill.

[21] Appl. No.: 605,885

[22] Filed: Oct. 30, 1990

[51] Int. Cl.[5] .............................................. G08B 21/00
[52] U.S. Cl. ................................... 340/663; 340/660; 363/51; 361/92
[58] Field of Search .................. 340/660, 663; 363/21, 363/35, 37, 55-58, 89; 361/92; 324/133

[56] References Cited

U.S. PATENT DOCUMENTS

| | | | |
|---|---|---|---|
| 4,415,960 | 11/1983 | Clark, Jr. | 363/21 |
| 4,554,501 | 11/1985 | Baker | 307/16 X |
| 4,694,193 | 9/1987 | Schlenk et al. | 363/21 X |
| 4,761,726 | 8/1988 | Brown | 363/51 |

Primary Examiner—Jin F. Ng
Assistant Examiner—Jeffery A. Hofsass
Attorney, Agent, or Firm—Michael S. Yatsko

[57] ABSTRACT

An electric power circuit with line voltage failure detection includes a pair of DC conductors for receiving a DC voltage, a capacitor connected across these conductors, and a main power converter connected to produce an output voltage on a main power bus in response to the DC voltage on the power conductors. A circuit branch connected across the power conductors includes the series connection of a primary winding of a transformer and a switching device. The switching device is operated to produce a series of voltage pulses across the secondary winding of the transformer. These voltage pulses are used to produce a second output voltage. The magnitude of these voltage pulses which occur during time when the switching device is off, is detected and a line failure indicating signal is produced when this magnitude falls below a predetermined value.

13 Claims, 1 Drawing Sheet 5,196,832

ELECTRIC POWER SYSTEM WITH LINE FAILURE DETECTION

BACKGROUND OF THE INVENTION

This invention relates to electric power systems and, more particularly, to such systems which include circuits for detecting imminent failure of the system voltage.

DC link variable speed constant frequency (VSCF) electric power systems, such as those typically used in aircraft applications, include a generator which is driven at a variable speed to supply a DC voltage to an inverter by way of a pair of DC link conductors. The output voltage of the generator is controlled by a regulator which monitors the inverter output and adjusts the generator field current to regulate the DC link voltage. Other circuits use a similar arrangement in which a converter derives various output voltages from a DC input. In certain applications of these circuits, such as in flight critical power systems, there is a need to supply a warning that the power on the main output bus is corrupt or about to be corrupt due to a drop in the DC link voltage.

The design of a circuit for supplying such a warning is complicated by the fact that the input and output power conductors of the system typically have separate ground lines for safety reasons and to minimize electromagnetic interference. One known technique for supplying the necessary warning signal has been the use of a dedicated switching module which chops the DC link voltage and transformer couples it to a control circuit where it is peak detected. When the peak value falls below some preselected threshold, a warning signal is produced.

This approach suffers from the fact that it requires a separate module designed to operate off of a high voltage primary DC input. This adds to the size of the system and to the amount of noise generated. It also increases the complexity and decreases the mean time before failure of the system. In addition, if the module fails, no warning of line failure is given. Therefore, it is desirable to devise a power system having a circuit for detecting impending line failure that is simple, inexpensive and fault tolerant.

SUMMARY OF THE INVENTION

An electric power circuit with line failure detection constructed in accordance with this invention includes a power circuit having a pair of DC power conductors for receiving a DC voltage, a capacitor connected across the power conductors, and a main power converter connected to receive DC voltage from the power conductors, for producing an output voltage on a main power bus. A primary winding of a transformer is electrically connected in series with a switching device in a circuit branch which is connected across the DC power conductors. A control circuit is provided to operate the switching device to produce a voltage across a secondary winding of the transformer. This transformer secondary voltage is used to produce additional system output voltage. Voltage pulses which appear across the secondary of the transformer during off times of the switching device are monitored and a line failure indicating signal is produced when the magnitude of these voltage pulses falls below a preselected value.

This invention encompasses both circuits constructed in accordance with the above description and the method of producing a line failure detection signal which is implemented by those circuits. As will be apparent from the following discussion, this invention utilizes a previously ignored component of the secondary voltage of a switching transformer to provide an indication of impending line voltage failure using a simple circuit which can be implemented without a significant increase in the size or complexity of the system.

BRIEF DESCRIPTION OF THE DRAWINGS

The present invention will be more readily apparent from the following description of the preferred embodiment thereof, shown in the accompanying drawings wherein.

DESCRIPTION OF THE PREFERRED EMBODIMENT

Figure 1:
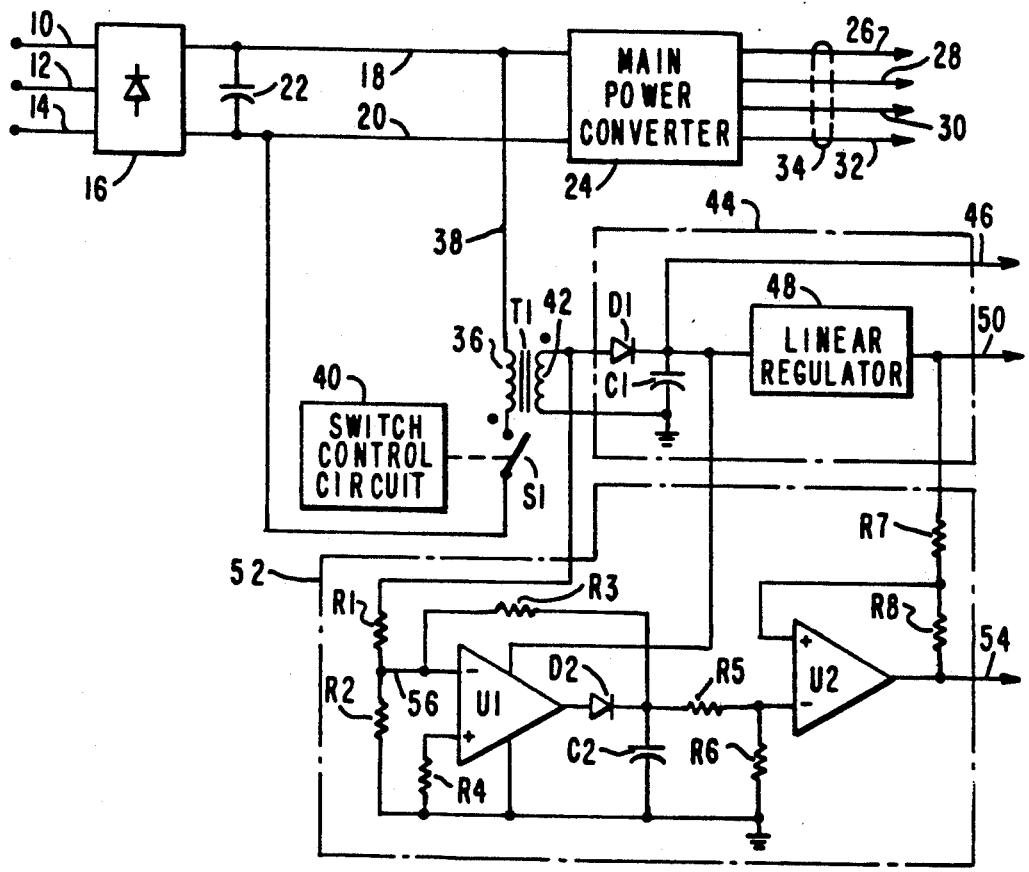
FIG. 1 is a schematic diagram of an electric power system constructed in accordance with the preferred embodiment of the present invention.

Referring to the drawings, FIG. 1 is a schematic diagram of an electric power system having line failure detection in accordance with the present invention. In this system, an AC input voltage, which may be supplied at a variable frequency, is applied to input lines 10, 12 and 14. This voltage is rectified by a rectifier 16 to produce a DC voltage on a pair of conductors 18 and 20. A capacitor 22 is connected across the DC conductors. A main power converter 24 receives the DC voltage on conductors 18 and 20 and produces a constant frequency AC output on conductors 26, 28, 30 and 32 of a main power bus 34.

A transformer T1 includes a primary winding 36 electrically connected in series with a switch S1 in a circuit branch 38 which is connected between conductors 18 and 20. The switch S1 is preferably a solid state device which is repeatedly operated in accordance with well-known techniques by a switch control circuit 40 to produce a voltage across secondary winding 42 of transformer T1. This voltage is delivered to a critical power converter 44 where it is rectified by diode D1 and filtered by capacitor C1 to produce a 15 volt control voltage on line 46. A linear regulator 48 is used to produce a regulated 5 volt output on line 50.

A voltage failure detection circuit 52 comprising resistors R1, R2, R3, R4, R5, R6, R7 and R8; diode D2; capacitor C2; and operational amplifiers U1 and U2 monitors the voltage across secondary winding 42 and produces a line failure indicating signal on line 54 when the voltage on winding 42 falls below a predetermined minimum value. Resistors R1 and R2 form a voltage divider which produces a status signal on line 56 that is representative of the magnitude of voltage pulses across secondary winding 42 during the off times of switch S1. Operational amplifier U1 inverts the status signal which is peak detected by diode D2 and capacitor C2. The peak value on capacitor C2 is compared to a reference voltage appearing at a junction point between resistors R7 and R8 by operational amplifier U2. The output of operational amplifier U2 goes to a logic high level when a line failure is detected. The signal on line 54 may be used by power system protection circuits which may use this signal as an instruction to store critical information, such as aircraft flight data, because the main power system is about to fail.

The main power converter 24 is designed to operate over a range of line voltages of for example, 75 to 150 volts DC. The reservoir capacitor 22 is used to support the operation of the main power converter for a few milliseconds in the event of a failure of the input voltage. This gives the power system enough warning to initiate an orderly shutdown and may enable the switching of the system to a backup system. The critical power converter 44 is designed to operate over a wide range of voltages on conductors 18 and 20 of, for example, 20 to 150 volts DC. This allows the line failure signal to be present long after the main power converter has dropped off line.

Figure 2A:
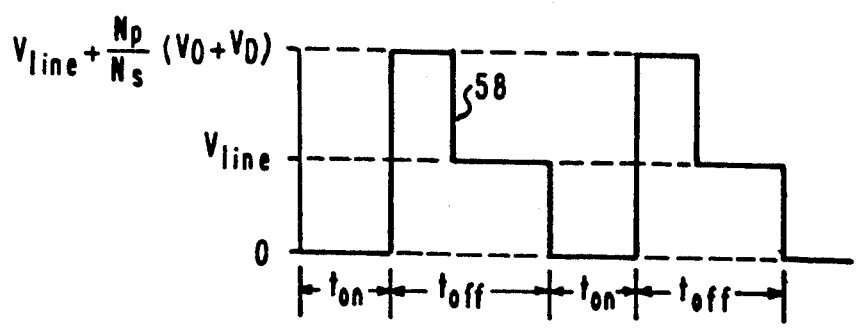
FIGS. 2A and 2B are waveform diagrams showing the voltage across the primary and secondary of the transformer T1 of FIG. 1.
Figure 2B:
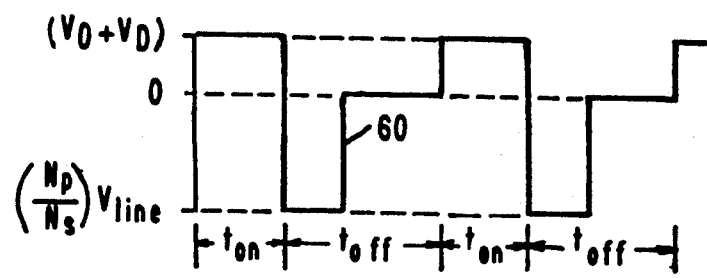

The critical power converter is typically a low power circuit and a fly back converter as illustrated in FIG. 1 is ideally suited for this application. The switching waveform for fly back transformer T1 are illustrated in FIGS. 2A and 2B. Waveform 58 represents the voltage across primary winding 36 and waveform 60 represents the voltage across secondary winding 42. In FIGS. 2A and 2B, $V_{line}$ is the voltage across conductors 18 and 20; $V_O$ is the voltage across capacitor C1; $V_D$ is the voltage across diode D1; and $t_{on}$ and $t_{off}$ are the on and off times of switch S1. $N_p$ is the number of turns in transformer winding 36 and $N_s$ is the number of turns in secondary winding 42. From the waveforms of FIGS. 2A and 2B, it can be seen that the positive going pulses of the fly back voltage of the transformer are limited by the rectified DC voltage on capacitor C1. However, the negative going pulses of the secondary voltage seen during the time interval when switch S1 is off, have a magnitude which is directly proportional to the DC voltage on conductors 18 and 20. In the circuit of FIG. 1, this voltage is divided down by voltage divider R1 and R2, inverted by operational amplifier U1 and peak detected by capacitor C2. If this voltage drops below a preset threshold, the line failure signal is activated on line 54. Hysteresis is added because a line failure may be defined to be a first value, for example 50 volts, when the line voltage drops out and a second value, for example 75 volts, when the line voltage is restored. These threshold levels will set the design margin for the reservoir capacitor 22. Hysteresis is achieved by the manner in which the reference voltage is applied to the comparator U2. If line 54 is high, the positive input to low. Since this input also acts as the reference to the comparator, the output is dependent upon the history of the comparator.

Although the present invention has been described in terms of its preferred embodiment, it will be apparent to those skilled in the art that various changes may be made without departing from the scope of the invention. It is therefore intended that the appended claims cover such changes.

What is claimed is:

1. An electric power circuit with line voltage failure detection, said circuit comprising:
   a pair of DC power conductors for receiving a DC voltage;
   a capacitor connected across said DC power conductors;
   a main power converter connected to receive said DC voltage from said DC power conductors, for producing an output supply voltage on a main power bus;
   a circuit branch connected in parallel with said DC power conductors, said circuit branch including a switching device and a primary winding of a transformer electrically connected in series with each other;
   means for controlling the operation of said switching device to produce a voltage across a secondary winding of said transformer, said voltage across said secondary winding including a series of voltage pulses corresponding to on and off times of said switching device, said series of voltage pulses having a negative peak amplitude that is proportional to said DC voltage; and
   means for producing a line failure indicating signal when the negative peak amplitude of said voltage pulses, in said voltage across said secondary winding during the off times of said switching device, falls below a preselected value, said line failure indicating signal indicating a failure of said DC voltage across said DC power conductors.

2. An electric power circuit with line voltage failure detection, as recited in claim 1, wherein said means for producing a line failure indicating signal comprises:
   means for producing a status signal representative of the negative peak amplitude of the voltage pulses across said secondary winding during the off times of said switching device;
   means for inverting said status signal;
   means for detecting the peak voltage value of the inverted status signal; and
   means for comparing said peak value to a reference voltage value to produce said line voltage failure signal when said peak voltage value falls below said reference voltage value.

3. An electric power circuit with line voltage failure detection, as recited in claim 2
   wherein said means for comparing includes means for producing hysteresis to alter said reference voltage value dependent on the previous state of said line voltage failure signal.

4. An electric power circuit with line voltage failure detection, as recited in claim 1 and further comprising means for producing a further output supply voltage in response to the voltage developed across said secondary winding of said transformer.

5. An electric power circuit with line voltage failure detection, as recited in claim 4, wherein said means for producing a further output supply voltage comprises:
   a rectifier circuit connected to receive said voltage developed across said secondary winding, said rectifier having a rectified voltage output; and
   a voltage regulator connected to receive said rectified voltage output and having an output upon which said further output supply voltage is produced.

6. An electric power circuit with line voltage failure detection, as recited in claim 5, further comprising:
   a voltage divider connected between said voltage regulator output and said line voltage failure signal, wherein said reference value is a voltage occurring at an intermediate point in said voltage divider.

7. An electric power circuit with line voltage failure detection, as recited in claim 5, wherein:
   said main power converter operates when said DC voltage is above a first threshold level; and
   said means for producing a further output supply voltage operates when said DC voltage is above a second threshold level, said second threshold level being lower than said first threshold level.

8. A method of detecting a line voltage failure in an electric power circuit, said method comprising the steps of:
placing a DC voltage on a pair of DC power conductors having a capacitor connected thereacross;
connecting a main power converter to receive said DC voltage from said DC power conductors, for producing an output voltage on a main power bus;
connecting a circuit branch in parallel with said DC power conductors, said circuit branch including a switch device and a primary winding of a transformer electrically connected in series with each other;
controlling the operation of said switching device to produce a voltage across a secondary winding of said transformer, said voltage across said secondary winding including a series of voltage pulses corresponding to on and off time of said switching device, said series of voltage pulses having a negative peak amplitude that is proportional to said DC voltage; and
producing a line failure indicating signal when the negative peak amplitude of said voltage pulses, in said voltage across said secondary winding during the off times of said switching device, falls below a preselected value, said line failure indicating signal indicating a failure of said DC voltage across said DC power conductors.

9. A method for detecting a line voltage failure in an electric power circuit, as recited in claim 8, wherein said step of producing a line failure indicating signal comprises the steps of:
producing a status signal representative of the negative peak amplitude of the voltage pulses across said secondary winding during the off times of said switching device;
inverting said status signal;
detecting the peak voltage value of the inverted status signal; and
comparing said peak voltage value to a reference voltage value to produce said line voltage failure signal when said peak voltage value falls below said reference voltage value.

10. A method for detecting a line voltage failure in an electric power circuit, as recited in claim 9, further comprising the step of:
providing hysteresis to change said reference voltage value in response to a prior magnitude of said line failure indicating signal.

11. An electric power circuit comprising:
a pair of DC power conductors for receiving a DC line voltage;
a main power converter connected to receive said DC line voltage for producing a first output supply voltage;
a critical power converter connected to receive said DC line voltage for producing a second output supply voltage, said critical power supply comprising
a transformer having a primary and secondary winding,
a switching device connected in series with said primary winding of said transformer, said series connected switching device and primary winding being connected in parallel with said DC power conductors,
means for controlling the operation of said switching device to produce a secondary voltage across said secondary winding including a series of voltage pulses corresponding to on and off times of said switching device, said series of voltage pulses having a negative peak amplitude that is proportional to said DC line voltage,
means connected to receive said secondary voltage for converting said secondary voltage to said second output supply voltage; and
means connected to said critical power converter for producing a line failure indicating signal when said negative peak amplitude of said voltage pulses falls below a preselected reference value thereby to indicate a failure of said DC line voltage.

12. A power supply circuit as claimed in claim 11 and further comprising a capacitor connected in parallel with said DC power conductors.

13. A power supply circuit as claimed in claim 12 wherein said main power converter is designed to operate over a first voltage range of said DC line voltage and said critical power converter is designed to operate over a second voltage range of said DC line voltage, the upper voltage limit of said second voltage range being smaller in magnitude than the upper limit of said first voltage range whereby said critical power converter will continue operating for a longer time period than said main power converter after failure of said DC line voltage.

* * * * *